United States Patent
Shydo, Jr. et al.

(10) Patent No.: US 10,133,276 B1
(45) Date of Patent: Nov. 20, 2018

(54) OBJECT AVOIDANCE WITH OBJECT DETECTION AND CLASSIFICATION

(71) Applicant: Amazon Technologies, Inc., Seattle, WA (US)

(72) Inventors: Robert Michael Shydo, Jr., Pelham, NH (US); Stephen A. Caldara, Cambridge, MA (US); Andrew Stubbs, Waltham, MA (US)

(73) Assignee: Amazon Technologies, Inc., Seattle, WA (US)

( * ) Notice: Subject to any disclaimer, the term of this patent is extended or adjusted under 35 U.S.C. 154(b) by 522 days.

(21) Appl. No.: 14/744,552

(22) Filed: Jun. 19, 2015

(51) Int. Cl.
 *G05D 1/02* (2006.01)
(52) U.S. Cl.
 CPC . *G05D 1/0214* (2013.01); *G05B 2219/31005* (2013.01); *G05D 2201/0216* (2013.01); *Y10S 901/01* (2013.01); *Y10S 901/47* (2013.01)
(58) Field of Classification Search
 CPC .............................. B25J 11/009; G05D 1/024
 USPC .......................................................... 701/36
 See application file for complete search history.

(56) References Cited

U.S. PATENT DOCUMENTS

| | | | | |
|---|---|---|---|---|
| 3,881,568 A | * | 5/1975 | Ando | B62D 1/28 180/168 |
| 3,935,922 A | * | 2/1976 | Cooper | A47L 11/4011 180/168 |
| 4,307,791 A | * | 12/1981 | De Bruine | B62D 1/28 180/168 |
| 4,566,032 A | * | 1/1986 | Hirooka | B66F 9/063 180/168 |
| 4,811,229 A | * | 3/1989 | Wilson | G05D 1/0242 180/169 |
| 4,954,962 A | * | 9/1990 | Evans, Jr. | G01C 21/00 180/169 |
| 5,202,742 A | * | 4/1993 | Frank | G01S 7/4811 180/167 |
| 5,590,244 A | * | 12/1996 | Nakata | B25J 9/1684 318/578 |
| 5,737,217 A | * | 4/1998 | Nishikawa | B62D 57/032 180/8.6 |
| 7,343,995 B2 | * | 3/2008 | Fukuhara | B64F 1/00 180/167 |
| 8,280,547 B2 | | 10/2012 | D'Andrea et al. | |
| 9,796,085 B2 | * | 10/2017 | Richter | B25J 9/162 |
| 9,989,963 B2 | * | 6/2018 | Perkins | G05D 1/0248 |

(Continued)

*Primary Examiner* — Minh Truong
*Assistant Examiner* — Michael E Butler
(74) *Attorney, Agent, or Firm* — Lee & Hayes, PLLC

(57) ABSTRACT

A robot equipped with an object detection system and an object identification system is used to move inventory holders throughout a warehouse or other environment. The robot can detect objects in its path using the object detection system, which can include one or more sensors for this purpose. The robot can then classify the object using the object identification system to determine an appropriate course of action. The robot can classify the object as an inventory item, warehouse equipment, or a person, among other things. The robot can take action based on the object classification. The robot can reroute around inventory items and warehouse equipment. When encountering people or objects that cannot be classified, the robot can stop and await further instructions. In some cases, the robot may wait for a manual reset before continuing along its path.

12 Claims, 10 Drawing Sheets

(56) References Cited

U.S. PATENT DOCUMENTS

| | | | |
|---|---|---|---|
| 2007/0112461 A1* | 5/2007 | Zini | G05B 19/41895 |
| | | | 700/245 |
| 2008/0077511 A1* | 3/2008 | Zimmerman | G06Q 10/00 |
| | | | 705/28 |
| 2010/0222954 A1* | 9/2010 | Ichinose | G05D 1/024 |
| | | | 701/26 |
| 2010/0234990 A1* | 9/2010 | Zini | G05B 19/41895 |
| | | | 700/245 |
| 2012/0089295 A1* | 4/2012 | Ahn | G05D 1/0242 |
| | | | 701/28 |
| 2012/0143427 A1 | 6/2012 | Hoffman et al. | |
| 2012/0182392 A1* | 7/2012 | Kearns | B25J 11/009 |
| | | | 348/46 |
| 2013/0026344 A1* | 1/2013 | Okuda | G03B 17/02 |
| | | | 250/208.1 |
| 2014/0152507 A1* | 6/2014 | McAllister | G06K 7/10376 |
| | | | 342/126 |
| 2015/0003669 A1* | 1/2015 | Solgi | G06K 9/3241 |
| | | | 382/103 |
| 2015/0073646 A1* | 3/2015 | Rosenstein | B25J 11/009 |
| | | | 701/28 |
| 2017/0276487 A1* | 9/2017 | Wang | G05D 1/024 |
| 2017/0308098 A1* | 10/2017 | Yu | G06Q 10/08 |
| 2017/0334069 A1* | 11/2017 | Wang | B25J 9/1689 |
| 2018/0049829 A1* | 2/2018 | Yates | A61B 34/37 |

* cited by examiner

OBJECT AVOIDANCE WITH OBJECT DETECTION AND CLASSIFICATION

BACKGROUND

Modern inventory systems, such as those in mail order and e-commerce warehouses, supply chain distribution centers, airport luggage systems, and custom-order manufacturing facilities, include a number of complex systems, including robots, automated shelving systems, radio frequency identification (RFID), and automated scheduling and routing equipment. Some systems, for example, comprise robots that travel to shelving systems to retrieve items, or the shelves themselves, and return them to a central location for additional processing.

Automated warehouses exist that use robots, for example, to move items or shelves from a storage location in the warehouse to a shipping location (e.g., for inventory items to be boxed and shipped). It is inevitable, however, that robots working in the warehouse will encounter objects in their path. The objects can comprise, for example, workers, trash, or inventory that has fallen from shelving units.

BRIEF DESCRIPTION OF THE FIGURES

The detailed description is set forth with reference to the accompanying figures. The use of the same reference numbers in different figures indicates similar or identical items or features.

DETAILED DESCRIPTION

Figure 1:
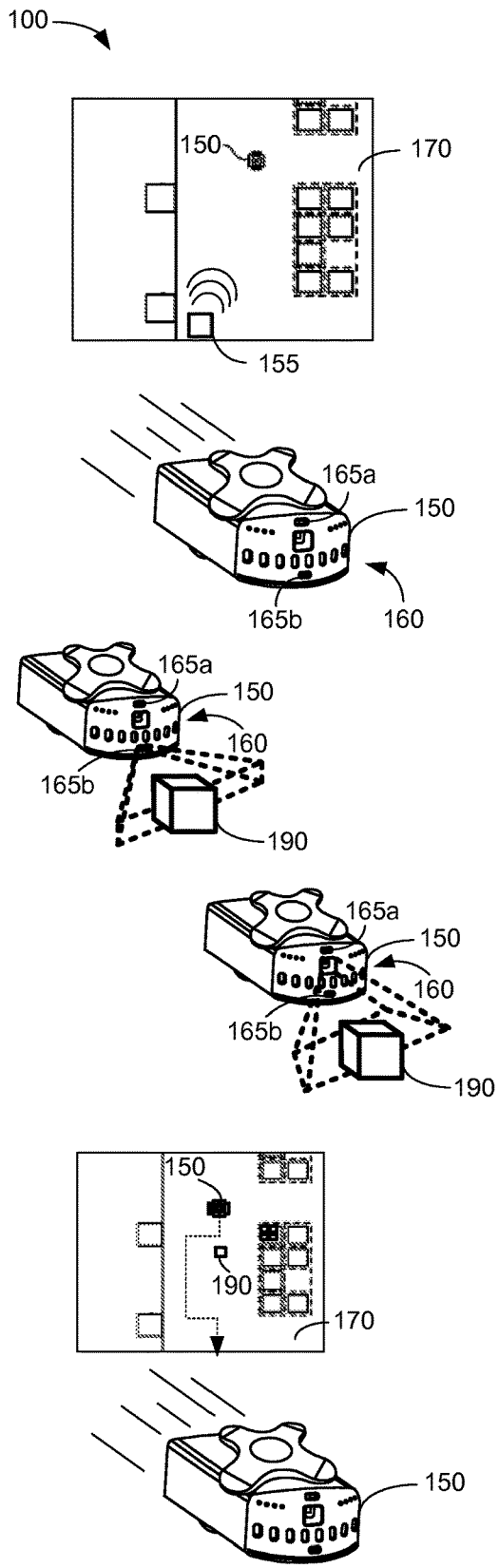
FIG. 1 is a pictorial flow diagram of an illustrative process for detecting and identifying an object encountered in the pathway of a robot, in accordance with some examples of the present disclosure.
Figure 1:
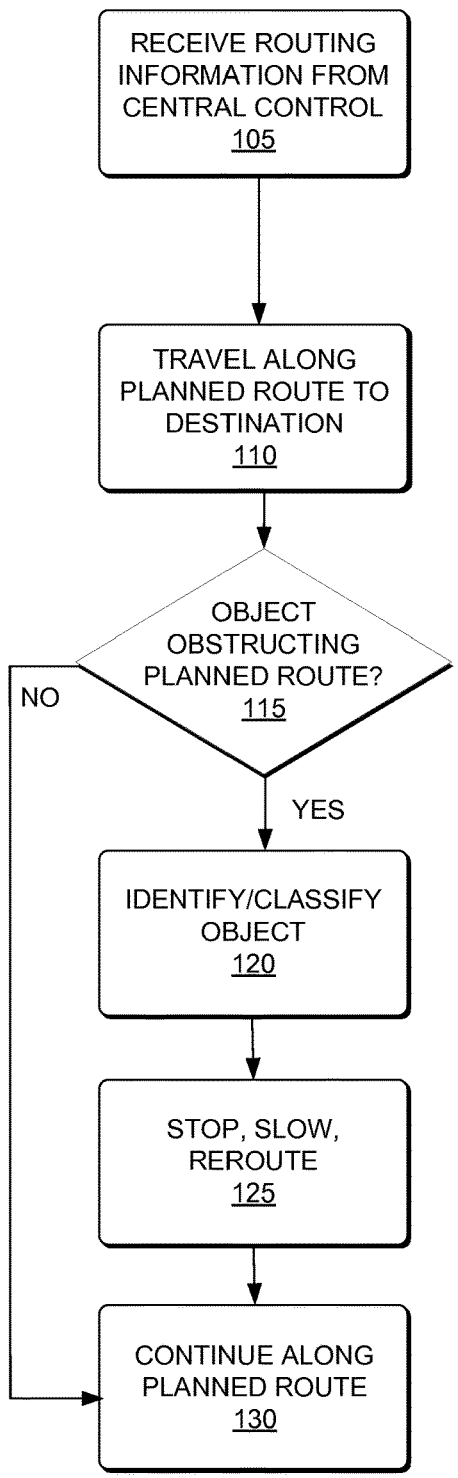

As discussed above, robots in modern inventory systems may encounter a wide variety of objects and obstacles in their path. Depending on the type of object or obstacle in their path, different actions may be appropriate. Examples of the present disclosure relate generally to automated warehouses, and specifically to one or more types of devices for use on robots to detect and identify obstructions, such as objects, on a warehouse floor. In some examples, the system can comprise one or more detectors located on the robot to detect objects in the pathway of the robot. In some examples, the one or more detectors can determine the size, shape, color, reflectivity, or other features of the obstruction. In some examples, the detector can be used in cooperation with one or more radio frequency identification (RFID) readers to identify tagged merchandise.

When an obstruction is identified in the path of a robot it can be important to determine what the object is for a variety of reasons. If the object is trash, for example, the robot can likely be routed around the obstruction with little regard for the object. If, on the other hand, the object is a person, it may be preferable to take a different action including, for example, a "full stop," which may indicate an additional verification step prior to the robot proceeding. In some examples, a full stop may cause a robot to remain stopped, powered down, or otherwise disabled, until receiving a reset signal—either manually or remotely (collectively, simply a "reset" or "reset command"). In some examples, the robot may receive a remote reset signal from a worker after additional review using an imaging device on the robot and/or other available imaging devices or surveillance systems in the vicinity of the robot. In other examples, a worker may walk out to the robot's location, assess the situation, and manually press a reset button.

A full stop can provide some opportunities that would not be provided otherwise. Having a human being on site (or on camera), for example, enables the person to assess the situation and retrieve the object or render or retrieve help, as necessary. If another worker is having a medical emergency and is lying on the floor, for example, the robot can come to a full stop, send a signal to the controller and await a reset. The situation can then be reviewed by a worker using an imaging device on the robot, for example, or by walking out into the warehouse to the location of the incident. The worker can then render assistance to their colleague and/or call for medical help prior to resetting the robot, as appropriate.

Because of the additional intervention, however, a full stop can be somewhat costly from a productivity standpoint. In some examples, stopping a particular robot may cascade to include additional robots and workers. In addition, when a robot is waiting for a reset, for example, a worker must either walk out onto the warehouse floor to manually reset the robot or reset the robot remotely, both of which take additional time. As a result, it may preferable to use other, less costly means when available.

If the obstruction can be identified—e.g., as warehouse equipment or product that has fallen out of a shelving unit, for example—then the robot may be able to simply reroute around the obstruction. If, for example, the robot detects an obstruction that contains an RFID tag, then the robot can identify the obstruction as fallen product, warehouse equipment, or warehouse worker, for example, and reroute around it. In some examples, during the process, the robot can report the obstruction to a controller to be retrieved by a cleanup robot or warehouse worker.

FIG. 1 is a pictorial flow diagram 100 showing example techniques for improving workflow and efficiency by enabling robots 150 to identify obstructions and take appropriate action. In some examples, this can be achieved using one or more sensors on the robot 150 to enable the robot 150 to detect and identify obstructions. In some cases, the robot 150 can use one or more sensors 160 to detect objects. In some examples, the sensors 160 can comprise one or more imaging devices, video cameras, infrared detectors, ultrasound detectors, or time-of-flight detection systems, among other things. In some examples, the sensors 160 may be forward-looking sensors oriented toward a direction of travel of the robot 150. Additionally or alternatively, the sensors 160 may be oriented in one or more other directions relative to the robot's direction of travel (e.g., backward, to either side, up, and down). In some examples, the sensors 160 may have a wide field of view (e.g., 90 degree view, 180 degree view, 360 degree view, etc.). In some examples, the sensors 160 can comprise one or more three-dimensional sensors that can detect obstructions and/or provide an estimated size or dimensions for the object.

In still other examples, one or more sensors can be located externally to the robot 150 to relay information to the robot 150. In some examples, a "bird's eye view" imaging device or camera, for example, can be used to provide additional information to the robot 150. In other examples, additional sensors can be provided on warehouse equipment, walls, floors, or in other areas to provide additional data. This additional data can be relayed to the robot 150 using wireless communications or other suitable means.

At 105, in the warehouse during normal operations, the robots 150, or drive units, can be routed by a controller 155 to various locations to, for example, retrieve merchandise, receive maintenance and/or recharging, or perform maintenance themselves (e.g., the robots 150 can perform maintenance, supply tools, take inventory images or provide lighting to maintenance operations). In some examples, the controller 155 can determine the route for the robot from the robot's current location to the next assignment (e.g., to retrieve a shelving unit). In other examples, the controller can simply provide a location (e.g., a grid number, row number, or GPS location within the warehouse) to the robot 150, enabling the robot 150 to generate its own path. In some examples, the robot 150 and the controller 155 can be in communication using suitable wireless means (e.g., 802.11x wireless systems).

At 110, regardless of how the path is determined, the robot 150 can begin traveling along the calculated path. When the robot 150 is traveling throughout the warehouse, the robot 150 can activate an object detection system 165a. As will be discussed in greater detail below, the object detection system 165a can be active when the robot 150 is moving and can include one or more sensors to detect and identify objects in the robot's path. In some examples, the object detection system 165a can both detect and provide data regarding the approximate size or volume of, or approximate sizing data for, the object 190. In some examples, the approximate sizing data can include, for example, one or more dimensions for the object 190, the approximate volume of the object 190, or the area of space the object 190 occupies on the floor. In this manner, the object identification system 165b may be able to determine that the object 190 is too small to be a person or too large to be an inventory item.

At 115, the object detection system 165a can determine if there is an object 190 in the path of the robot 150. If no object 190 is detected, at 130, the robot 150 can simply continue along its path and continue scanning for obstructions. If the robot 150 reaches its destination without encountering any obstructions, the robot 150 can perform the operation it was instructed to perform. This can include, for example, delivering an inventory holder 185 to a location such as a work station 180 or connecting to a charger.

At 120, if an obstruction is detected in the path of the robot 150, the robot 150 can attempt to classify the object 190. The robot 150 can scan the object 190 with an RFID reader, for example, to determine if the object 190 is equipped with an RFID tag. In some cases, the presence of an RFID tag can indicate that the object 190 is an inventory item or warehouse equipment. In other examples, warehouse workers 102 can wear RFID tags to identify themselves to the robots 150. In some examples, warehouse workers 102 may have unique RFID tags that distinguish them from inventory items or warehouse equipment, among other things. In still other examples, the robot 150 may scan the object 190 with a 3D scanner to determine the approximate size of the object 190. If the object 190 is determined to be too large or too small to be a person, for example, the robot 150 may simply classify the object 190 as "non-human."

In some examples, in addition to the object detection system 165a, the robot 150 can also be equipped with an object identification system 165b. This can include, for example, an imaging device, an RFID reader, a 3D scanner, or a bar code scanner. In a warehouse where the inventory items are tagged with RFID tags, for example, the object identification system 165b can include an RFID reader. If the object identification system 165b detects an RFID tag at the same time the object detection system 165a detects an obstruction, therefore, the object identification system 165b can determine that the obstruction is likely an inventory item that has fallen onto the floor. In this case, the robot 150 can simply reroute around the obstruction and continue on its way.

At 125, depending on whether the object 190 has been classified, the robot 150 can take one of several evasive actions. If, for example, the object 190 is determined to be a dropped inventory item, the robot 150 can simply reroute around the object. At 130, the robot can then continue along the planned route, or path. If, on the other hand, the nature of the object 190 cannot be determined, the robot 150 may come to a full stop and await further instructions. In some cases, such as when the object 190 cannot be identified or is likely a person, for example, the robot 150 may wait for a manual or remote reset to resume operation. This can enable a warehouse worker, for example, to identify the object 190, remove it, and/or render aid, as necessary.

Whether, and how, the object 190 is identified by the object identification system 165b can determine what evasive action the robot 150 can take. In some examples, the robot 150 may slow down at a first distance (e.g., 10 feet from the object 190) upon detecting an object 190 with the object detection system 165a, but continue scanning the object 190 with the object identification system 165b. If the robot 150 reaches a second, closer distance (e.g., 5 feet) without identifying the object 190, however, the robot 150 may come to a stop. As mentioned above, if the object 190 cannot be identified or is identified as potentially being a person, the robot 150 can stop and await additional instructions or a manual or remote reset, among other things.

Figure 2A:
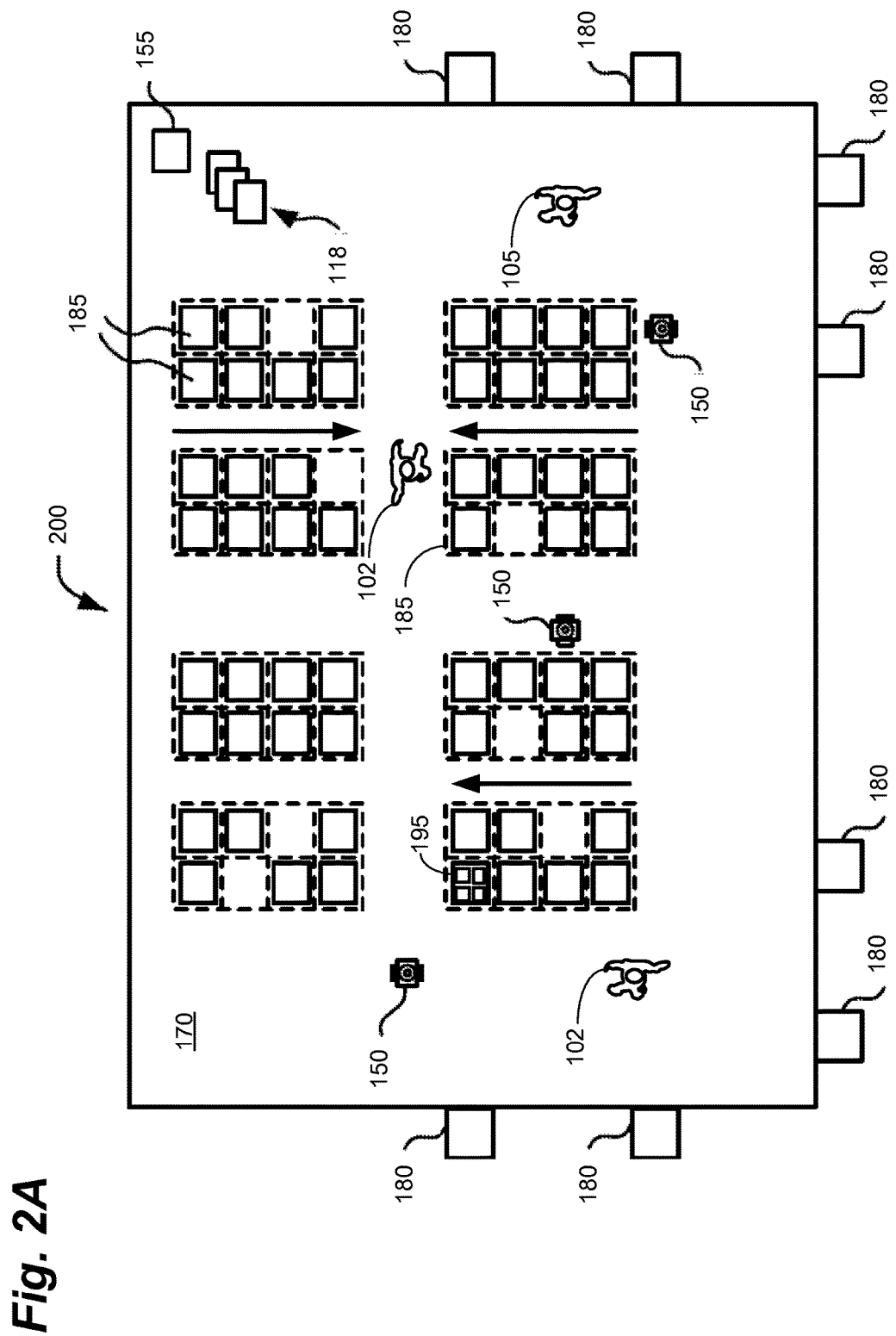
FIGS. 2A and 2B are schematic diagrams that depict components of an illustrative automated warehouse, in accordance with some examples of the present disclosure.

FIG. 2A illustrates an inventory control system 200 comprising a plurality of robots 150 with object detection 165a and/or object identification 165b systems. The inventory control system 200 can comprise a management module, or controller 155, one or more mobile drive units, or robots 150, one or more inventory containers, pods, or holders 185, and one or more inventory work stations 180. The robots 150 can transport the inventory holders 185 between points within a warehouse 170 on their own, or in response to commands communicated by the controller 155. Each inventory holder 185 can store one or more types of inventory items 195. As a result, the inventory control system 200 is capable of moving inventory items 195 between locations within a workspace, such as a storage facility or warehouse 170 to facilitate the entry, processing, and/or removal of inventory items 195 from inventory control system 200 and the completion of other tasks involving the inventory items 195.

The controller 155 can assign tasks to the appropriate components of the inventory control system 200 and coordinate operation of the various components in completing the tasks. These tasks may relate both to the movement and processing of inventory items and the management and maintenance of the components of inventory control system 200. The controller 155 may assign portions of the warehouse 170, for example, as parking spaces for the robots 150, the scheduled recharge or replacement of robot 150 batteries, the storage of inventory holders 185, cleanup robots, or cleanup pods, or any other operations associated with the inventory control system 200 and its various components.

The controller 155 may select components of the inventory control system 200 to perform these tasks and communicate appropriate commands and/or data to selected components to facilitate completion of these operations. Although shown in FIG. 2A as a single, discrete component, the controller 155 may represent multiple components and may represent, or include, portions of the robots 150, inventory holders 185, or other elements of the inventory control system 200. As a result, any or all of the interaction between a particular robot 150 and the controller 155 that is described below may, for example, represent peer-to-peer communication between that robot 150 and one or more other robots 150, or may comprise internal commands based on memory in the robot 150, for example.

As mentioned above, the robots 150 can be used to move inventory holders 185 between locations within the warehouse 170. The robots 150 may represent many types of devices or components appropriate for use in inventory control system 200 based on the characteristics and configuration of inventory holders 185 and/or other elements of inventory control system 200. In a particular embodiment of inventory control system 200, the robots 150 can represent independent, self-powered devices, such as wheeled or tracked robots or robotic carts, for example, configured to freely move about warehouse 170. Examples of such inventory control systems are disclosed in U.S. Patent Publication No. 2012/0143427, published on Jun. 7, 2012, titled "SYSTEM AND METHOD FOR POSITIONING A MOBILE DRIVE UNIT," and U.S. Pat. No. 8,280,547, issued on Oct. 2, 2012, titled "METHOD AND SYSTEM FOR TRANSPORTING INVENTORY ITEMS," the entire disclosures of which are herein incorporated by reference.

Additionally, the robots 150 may be capable of communicating with the controller 155 to receive tasks, inventory holder 185 assignments, transmit their locations or the locations of other robots 150, or exchange other suitable information to be used by controller 155 or robots 150 during operation. The robots 150 may communicate with controller 155 using, for example, wireless, wired, or other connections. In some examples, the robots 150 may communicate with controller 155 and/or each other using, for example, 802.11 specification wireless transmissions (e.g., b/g/n), Bluetooth, radio frequency (RF), Infrared Data Association (IrDA) standards, or other appropriate wireless communication protocols.

In still other embodiments, the robots 150 can be autonomous or semi-autonomous. In some examples, the robots 150 may travel along a fixed path, for example, from a first location to a second location delivering items between the first location and the second location without direction from the controller 155. In other examples, the robots 150 may operate semi-autonomously and receive partial instructions from the controller 155, such as "navigate to a first location," and the robots 150 can determine the path from their current location to the first location.

In particular examples, the inventory control system 200 may also include one or more inventory work stations 180. Inventory work stations 180 represent locations designated for the completion of particular tasks involving inventory items. Such tasks may include the removal of inventory items 195, the addition, or restocking, of inventory items 195, the counting of inventory items 195, the unpacking of inventory items 195 (e.g. from pallet- or case-sized groups to individual inventory items), the consolidation of inventory items 195 between inventory holders 185, and/or the processing or handling of inventory items 195 in any other suitable manner. The work stations 180 may represent both the physical location and also any appropriate equipment for processing or handling inventory items, such as work benches, packing tools and supplies, scanners for monitoring the flow of inventory items in and out of inventory control system 200, communication interfaces for communicating with controller 155, and/or any other suitable components. Inventory work stations 180 may be controlled, entirely or in part, by human operators or may be partially or fully automated.

In operation, the controller 155 selects appropriate components to complete particular tasks and transmits task assignments 118 to the selected components. These tasks may relate to the retrieval, storage, replenishment, and counting of inventory items and/or the management of robots 150, inventory holders 185, inventory work stations 180, cleanup robots, cleanup pods, and other components of inventory control system 200. Depending on the component and the task to be completed, a particular task assignment 118 may identify locations, components, and/or actions associated with the corresponding task and/or any other appropriate information to be used by the relevant components in completing the assigned task.

Figure 2B:
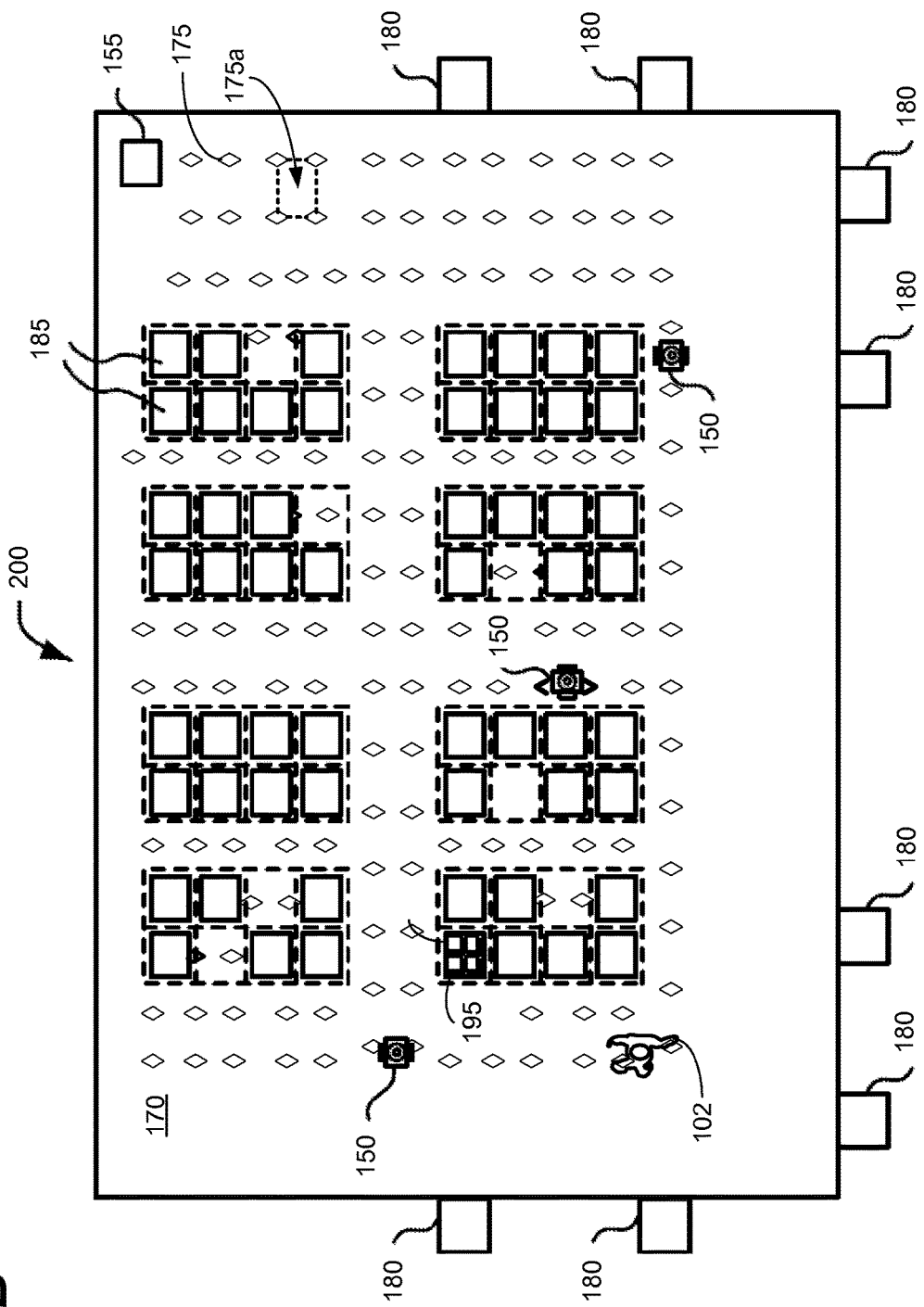

In some examples, as shown in FIG. 2B, the warehouse 170 floor can also comprise a plurality of markers, or fiducial markers 175, to enable the robots 150 to establish their location in the warehouse. Because the robots 150 are generally low enough to travel under inventory holders 185 (i.e., to be able to lift them), in some examples, the fiducial markers 175 can continue under the inventory holders 185, substantially spanning the entire floor. In some examples, the area between the fiducial markers 175 can define grid areas 175a with a fiducial marker 175 at each corner. When attempting to locate a particular inventory holder 185, therefore, the robot 150 can locate the fiducial marker 175, or grid 175a, associated with the inventory holder's location by scanning the floor with a downward facing imaging device, scanner or other sensor and then confirm that it is in the right location by imaging, scanning or sensing the bottom of the inventory holder 185 with an upward facing imaging device, scanner or other sensor. In some examples, the inventory holder 185 and/or the fiducial markers 175 can include 2D or 3D bar codes, RFID tags, or other identifiers.

When an object 190, such as merchandise or trash, for example, is identified in the warehouse 170 by a worker or a robot 150, its location can be provided to the controller 155

(or a separate cleanup system) identifying the obstacle's grid 175a or fiducial marker 175. The controller 155 can then alert a worker 102, route a cleanup robot, or a robot 150 and the cleanup pod, for example, to the location to retrieve the obstacle.

Figure 3:
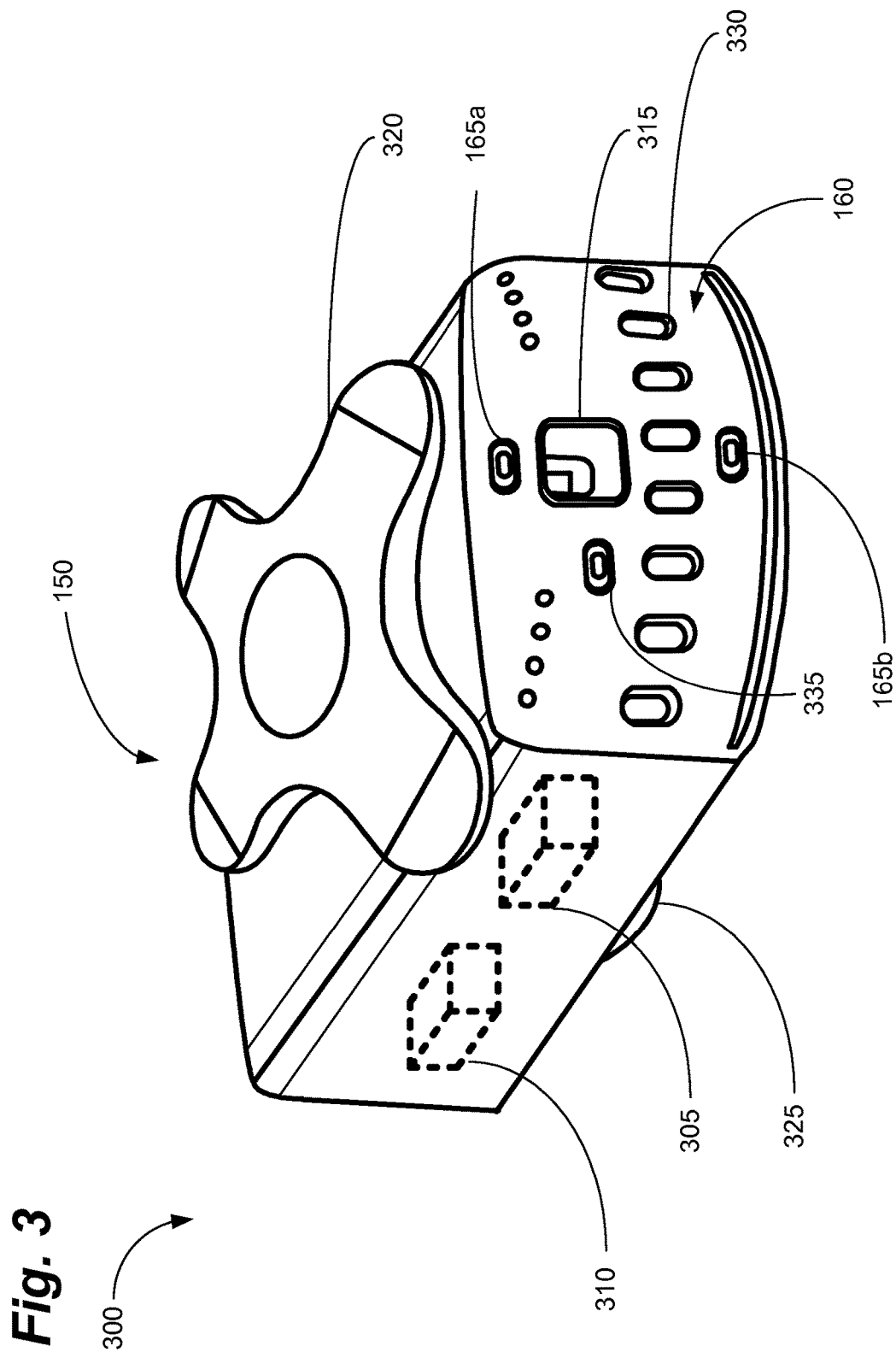
FIG. 3 is an isometric view of an illustrative robot with multiple forward-looking sensors for detecting and identifying objects in the pathway of the robot, in accordance with some examples of the present disclosure.

FIG. 3 is a schematic view showing additional details of an example robot 150 comprising an object detection system 165a, an object identification system 165b, a processor 305, and a transceiver 310. In some examples, the processor 305 can receive data from the object detection system 165a and the object identification system 165b. The processor 305 can then process the data to detect and identify an object in the path of the robot 150. In other examples, the processor 305 can send the data to the controller 155 for additional analysis using the transceiver 310. In some examples, the transceiver 310 can also comprise one or more internal or external antennas. The transceiver 310 can communicate with the controller 155 using one or more appropriate communications protocols such as, for example, one of the 802.11x wireless protocols. In this configuration, the transceiver 310 can receive instructions from the controller 155 regarding the appropriate evasive action. In still other embodiments, the processor 305 can perform some onboard calculations and analysis, while other calculations and analysis are performed remotely by the controller 155. Thus, some or all of the processing can be performed by the robot 150 or the controller 155, or both.

The robot 150 can also comprise a drive system 325. The drive system 325 can comprise one or more drive wheels, one or more electric motors, and one or more batteries for moving the robot 150 throughout the warehouse. The robots 150 can be recharged periodically at charging stations in the warehouse. Of course, other drive system components could be used such as, for example, tracks instead of wheels or gasoline or propane engines instead of motors.

In some examples, the robots 150 can also comprise an imaging device, such as a camera 315. The camera 315 can comprise, for example, a video camera or infrared camera. In some examples, the camera 315 can be used by the processor 305 to identify fiducials 175 and other markings to enable the robot 150 to navigate through the warehouse. In other examples, the camera 315 can provide imaging to the controller 155, or to workers 102, to assist the robot 150 is certain situations (e.g., identifying an object 190 that cannot otherwise be identified). In some examples, the camera 315 can also be used for functions in the object detection 165a and object identification 165b systems.

In some examples, the robot 150 can also comprise a bar code reader or scanner 335. In some examples, the camera 315 can be used to read bar codes and quick response (QR) codes, among other things. In other examples, the robot 150 can include a dedicated bar code reader 335 such as, for example, a laser bar code scanner. The bar code reader 335 can enable the robot 150 to read bar codes located on the fiducials 175, inventory holders 185, inventory items 195, and other components in the warehouse. The bar code reader 335 can also be capable of reading QR codes, symbols, object size and shape, and/or other signals.

In some examples, the robot 150 can also comprise one or more proximity sensors 330. The proximity sensors 330 can enable the robot to detect objects near the robot 150 to prevent collisions. The proximity sensors 330 can comprise, for example, ultrasonic or infrared proximity sensors. The proximity sensors 330 can be the same sensors used for the object detection system 165a or can be in addition to the object detection system 165a sensors. In some examples, the robot 150 can comprise a plurality of proximity sensors 330 with different focal lengths or patterns. In some examples, therefore, a first set of the proximity sensors 330 can be used for general collision avoidance, while a second set of proximity sensors 330 can be used specifically for object detection.

In some examples, the robot 150 can also comprise a lifting mechanism 320 to enable the robot 150 to lift and carry inventory holders 185, and other objects in the warehouse. In some examples, the lifting mechanism 320 can comprise an electric, hydraulic, electro-hydraulic, mechanical, or pneumatic lifting system. In some examples, the lifting mechanism 320 can also include one or more electrical and/or communications connections to enable the lifting mechanism 320 to interface with inventory holders 185, or other warehouse equipment such as, for example, battery chargers.

In some examples, the object detection system 165a and the object identification system 165b can comprise one or more forward-looking sensors 160 for detecting and identifying, or classifying, objects in the path of the robot 150. In some examples, when one of the sensors 160 detects an object 190 in the robot's path, the robot 150 can take one or more evasive actions. The robot 150 can, for example, come to a full stop, slow down, or reroute around the object 190.

In some examples, the object detection system 165a can use a first set of sensors that includes some or all of the forward-looking sensors 160. Similarly, the object identification system 165b can use a second set of sensors that includes some or all of the forward-looking sensors 160. In some examples, the first set of sensors can comprise the same sensors as the second set of sensors. In other examples, the first set of sensors can comprise a different set of sensors than the second set of sensors. In other words, some or all of the sensors used in the first set may not be used in the second set, and vice-versa.

In some examples, the object detection system 165a can use a fairly simple sensor such as, for example, an ultrasonic sensor. Because the object detection system 165a merely has to detect the presence of an object 190, the use of a relatively simple sensor may be preferable, for example, to reduce power consumption, maintenance, and/or equipment costs. In this vein, in some examples, the object detection system 165a may be a simple binary sensor that provides a binary operator as an output (e.g., the system 165a either detects an object or not). In some examples, the system 165a can output a first, binary operator (e.g., on or off) when no object 190 is detected in front of the robot 150 and a second, binary operator (e.g., the other of on or off) when an object 190 is detected. In other embodiments, the object detection system 165a may include additional information such as, for example, the distance from the robot 150 to the object 190 or the approximate size of the object 190. The object detection system 165a can comprise one or more proximity sensors such as, for example, a video camera, ultrasonic, infrared, laser, or radar detector to detect an object in front of the robot 150.

To determine what to do when an object 190 is detected, the robot 150 can also include an object identification system 165b. The object identification system 165b can attempt to automatically determine the nature of the object 190 using one or more of the forward-looking sensors 160. As mentioned above, the object identification system 165b can use the same or different sensors as the object detection system 165a. The object identification system 165b can attempt to classify the object 190 to enable the robot 150 to take an appropriate evasive action.

In some examples, the object identification system 165*b* can provide classification data for objects 190 including data regarding whether the object 190 is (1) an inventory item 195 or warehouse equipment (e.g., an inventory holder 185) (2) unknown, but not a person, and (3) unknown, but possibly a person. In some examples, the object 190 may include an RFID tag or bar code, for example that enables the robot 150 to classify the object 190 as an inventory item 195. In this case, the robot 150 can simply classify the object 190 as an inventory item 195 and then reroute around the object 190.

In other examples, the robot 150 can include a database and can identify the inventory item 195 and/or retrieve inventory item data. This can enable the robot 150 to identify the inventory item 195 and decide what evasive action to take, if any. In still other examples, the robot 150 can communicate with the controller 155 to receive inventory item data. The inventory item data can include, for example, the size, weight, and cost of the inventory item 195, the material(s) from which the inventory item 195 is manufactured, and/or the packaging in which the inventory item 195 is packaged.

The inventory item data can be used to determine an appropriate evasive action. In some examples, the geometry of the inventory item 195 can be used, for example, to plot an appropriate path around the inventory item 195. In other examples, if the inventory item 195 is inexpensive or is packaged in robust packaging, for example, routing the robot 150 around the inventory item 195 may be more easily undertaken. In other words, if the item is inexpensive, then damaging it is of little consequence. Similarly, if the inventory item 195 is packaged in a crate or a hard-sided case, for example, there is little chance of the robot 150 damaging it in the case of accidental contact.

Conversely, if the inventory item 195 is an expensive dress packaged only in a slip cover, for example, then the likelihood and cost of damage is increased. The risk of damaging merchandise can be weighed against the cost of stopping some or all of the robots 150 and/or requiring remote or manual resets to resume normal operation. In other words, stopping the robot(s) 150 costs money in lost productivity, but damaging merchandise can make it unsaleable, which also costs money.

In some examples, therefore, the object identification system 165*b* can comprise an RFID reader. In warehouses 170 that tag inventory items 195 with RFID tags, therefore, when an object 190 is detected by the object detection system 165*a*, the object identification system 165*b* can then activate the RFID reader. If the object 190 is an inventory item 195, the RFID reader will receive a return signal from the RFID tag on the inventory item 195.

In some examples, the object identification system 165*b* may essentially be binary. In other words, when the object identification system 165*b* receives a return signal from an RFID tag, the object identification system 165*b* classifies the object 190 as an inventory item 195 and the robot 150 can then be rerouted around the object 190. If not, in other examples, as mentioned above, the object identification system 165*b* can also use the RFID tag to identify the inventory item 195 and retrieve or receive inventory data about the inventory item 195. In this manner, the robot 150 (or the controller 155) can determine whether and how to reroute around the object 190.

In other embodiments, the object identification system 165*b* can also include a scanning sensor capable of determining the approximate size and/or dimensions of the object 190. In this configuration, the object identification system 165*b* can comprise, for example, a three-dimensional (3D) laser or light emitting diode (LED) scanner. The scanner can use time-of-flight or triangulation techniques, for example, to provide an approximate size of the object 190 to the object identification system 165*b*. As before, this can enable the robot 150 or controller 155 to identify the object and to determine an appropriate course of action.

If, for example, the object identification system 165*b* determines that the object 190 is only one inch tall, it is unlikely to be a person, but rather is likely either an inventory item 195 or trash. In this case, the object identification system 165*b* may simply label the item 190 as "non-human" and the robot 150 can maneuver around the object 190 without additional input. It is possible, of course, that the robot 150 may partially run over the object during the process, but this may be of little consequence. If the object 190 is trash, for example, then any damage to the object 190 is irrelevant. If the object 190 is merchandise that is damaged by the robot 150, then the average cost of such damage can be weighed against the cost of a full stop for the robot 150 on the overall system 200. In some examples, the aforementioned inventory item data can be used to decide whether to proceed. Similarly, any damage caused to the robot 150 by running over objects 190 must be weighed against system costs.

If, on the other hand, the object identification system 165*b* detects an object that cannot be readily identified, the robot 150 may decide to come to a full stop. If, for example, the object 190 does not have an RFID tag and/or is too large to be an inventory item 195, it is possible that the object 190 could be a person. This could be because a worker 102 is having a medical emergency (e.g., diabetic shock) or because a worker has fallen in the warehouse 170. Regardless, if the object 190 cannot be identified, the robot 150 can stop at a predetermined distance from the object 190 and send a message to the controller 155. The controller 155 can then dispatch a worker 102 or specialized robot, for example, to investigate. In some examples, the worker 102 can use the camera 315 on the robot 150 to remotely classify the object 190 and determine if the object 190 warrants a full stop.

Upon arriving at the scene, if the worker 102 (or robot) determines that the object 190 is a person, the worker 102 can render assistance and/or call for help, as applicable. If, on the other hand, the object 190 is merely a large box, for example, the worker 102 can remove the box from the robot's path and/or reset the robot 150 to continue on its path. The reset can comprise simply pressing a reset button on the robot 150, for example, or sending a remote command from the controller 155 to the robot 150 to continue.

Figure 4A:
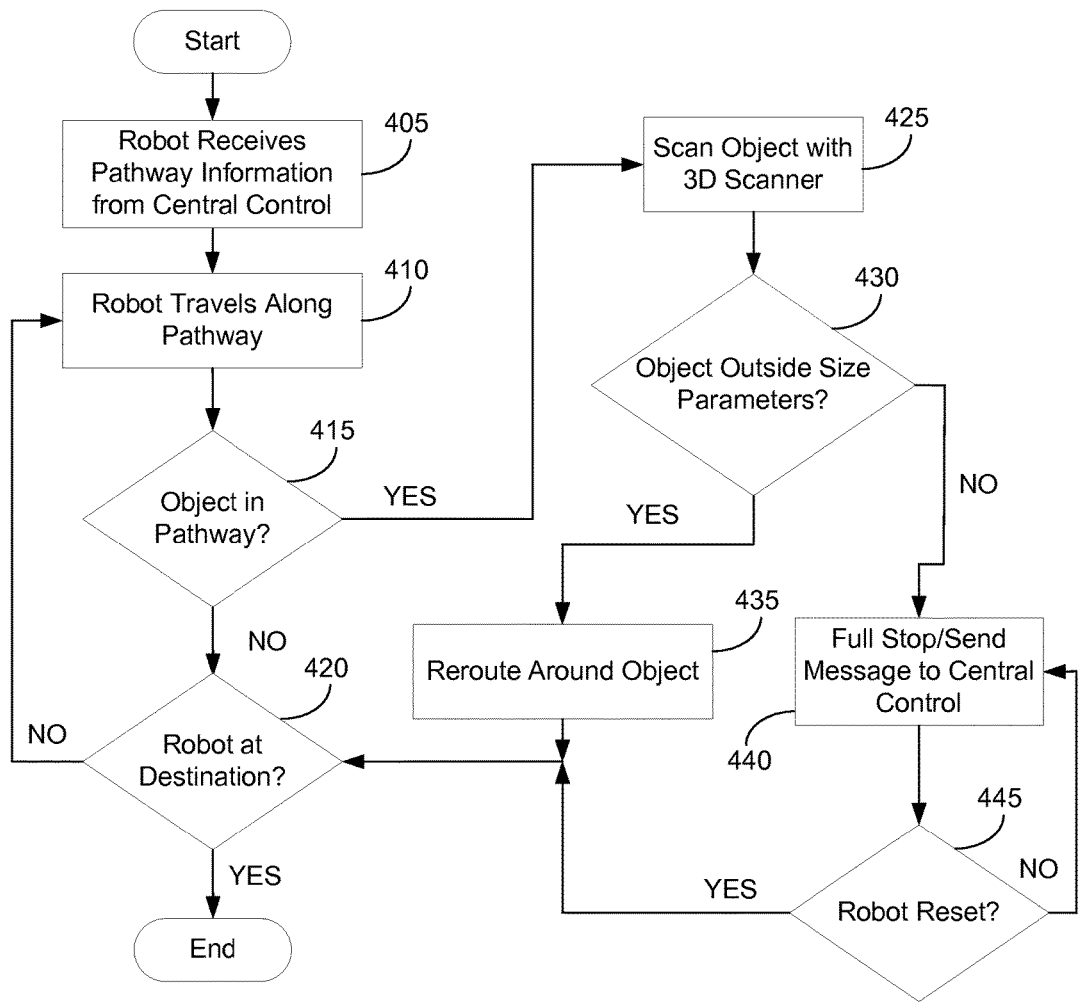
FIG. 4A is a flow diagram of an illustrative process for detecting and identifying an object encountered in the pathway of a robot using a three-dimensional (3D) scanner, in accordance with some examples of the present disclosure.
Figure 4B:
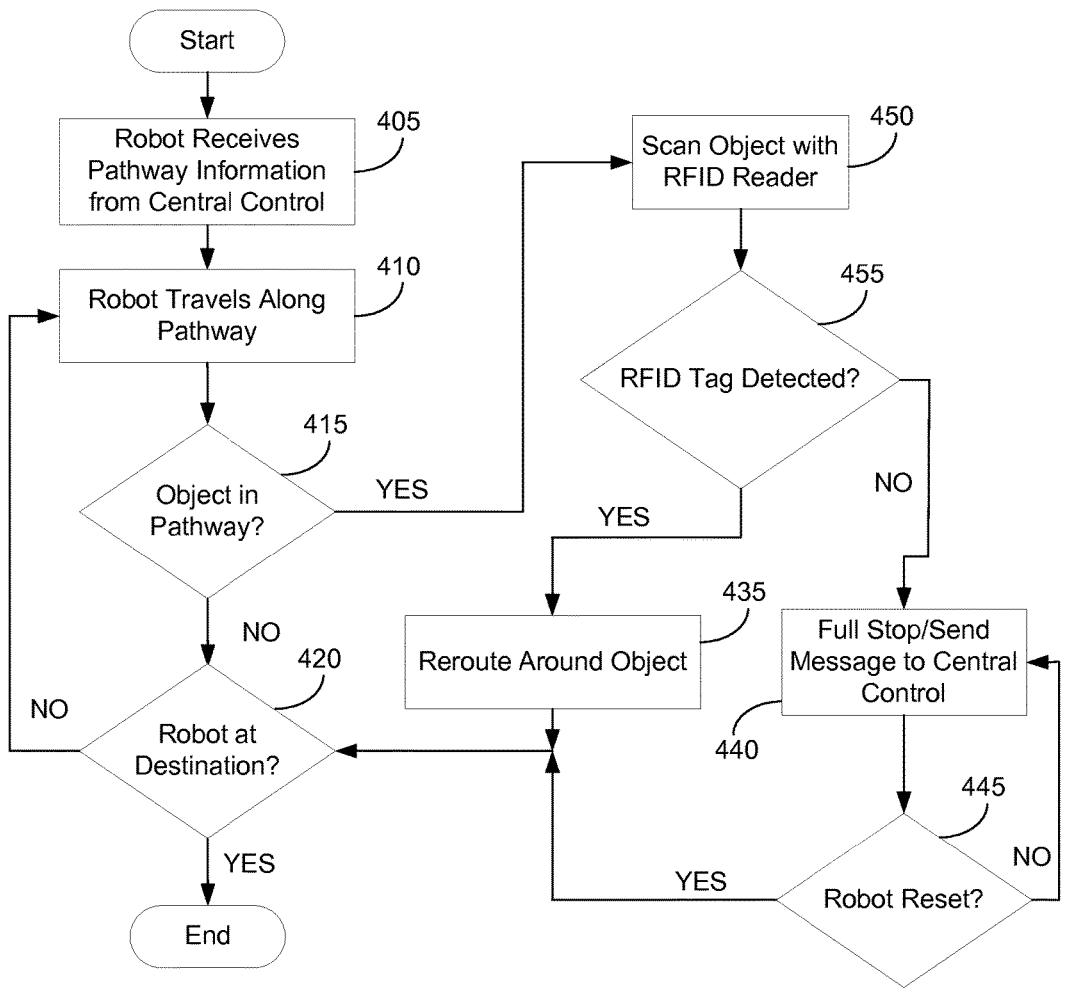
FIG. 4B is a flow diagram of an illustrative process for detecting and identifying an object encountered in the pathway of a robot using a radio frequency identification (RFID) reader, in accordance with some examples of the present disclosure.
Figure 4C:
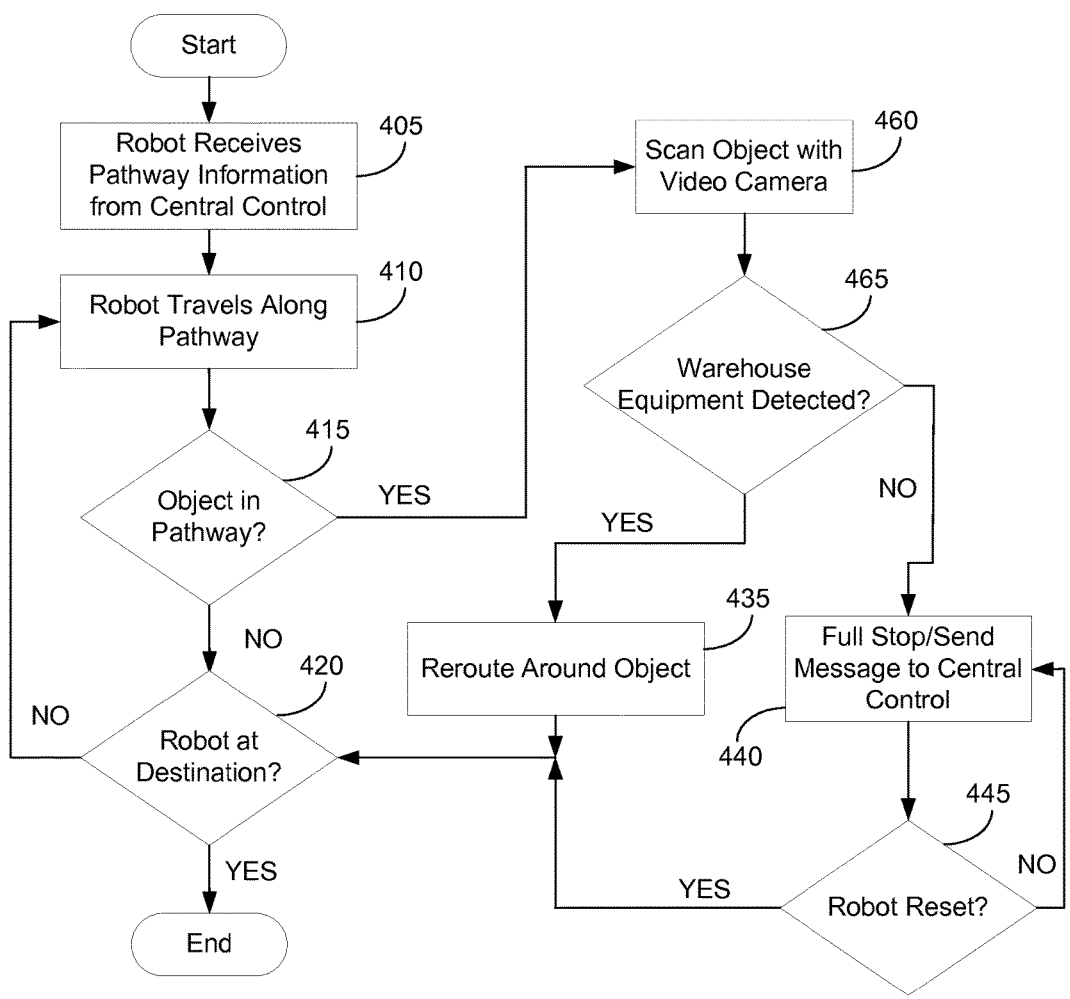
FIG. 4C is a flow diagram of an illustrative process for detecting and identifying an object encountered in the pathway of a robot using an imaging device, in accordance with some examples of the present disclosure.

As shown in FIGS. 4A-4C, examples of the present disclosure can also comprise a system and method 400 for detecting and classifying objects on the warehouse floor in the pathway of a robot. In some examples, as shown in FIG. 4A, the method 400 can include scanning the object with an object identification system capable of determining the approximate size of the object. As mentioned above, this can include a variety of 3D sensors including, but not limited to, a video camera, laser scanner, or time-of-flight ("TOF") scanner. In some examples, the scanner can comprise, for example, an LED TOF scanner including a combined CCD/CMOS imager chip utilizing LEDs as the lighting source. In this manner, a single receiver can be paired with a custom LED board and an optical lens to provide the desired field of view of the sensor. See, e.g., http://www.espros.com/3d-imagers.

At 405, the robot can receive pathway information from the controller. In some examples, the pathway information can simply include a final location within the warehouse. In this configuration, the robot can generate a pathway, based on known travel patterns, for example, from its current location to the final location, or destination, specified in the pathway information. In other examples, the controller can provide detailed routing information to the robot from the robot's current location to the requested destination. The routing information can include, for example, directions of travel, waypoints (e.g., fiducial markers), turns, and distances. The robot can then use the fiducials on the floor to navigate along the path provided in the pathway information.

At 410, the robot can travel along the pathway en route to the final destination and scan for objects in the pathway. In some examples, the robot can scan continuously for obstructions any time the robot is moving. In other examples, the robot can scan periodically as the robot is moving. In some examples, the robot can scan multiple times per second (e.g., 10 Hz), once per second, or once every several seconds (e.g., every 3, 5, or 10 seconds) depending on the speed of the robot, the range of the sensor, and/or traffic levels in the warehouse.

In some examples, the periodicity of the scan can change in concert with the speed of travel of the robot, for example, with increased robot travel speed triggering increased scanning frequency. Similarly, the scanning frequency can be increased based on the level of traffic in the warehouse. In other words, more active robots traveling through the warehouse at a given time can increase the scanning frequency accordingly. In other examples, the scanning frequency can be adjusted based on the range of the sensor on the robot, with longer range sensors requiring lower frequency scanning, and vice-versa.

At 415, a processor, using the forward looking sensors, can determine if an object has been detected in the pathway of the robot. As mentioned above, the object detection system may provide a simple binary, or on-off, signal to the processor. In other examples, the object detection system can provide a variable signal and the processor can determine if the signal is above a predetermined threshold, for example. In some examples, providing a threshold measurement can reduce the number of false positives caused by very small objects, for example.

At 420, if no object is detected along the pathway, the processor can determine if the robot is at its destination, or final location. If so, the method 400 ends and the robot can receive the next command (e.g., "retrieve inventory holder 01XA5"). If the robot detects an object in the pathway, on the other hand, the robot can use one or more sensors to determine an appropriate evasive action.

At 425, in some examples, the robot can scan the object with a 3D scanner capable of determining the approximate size and/or dimensions of the object. In some examples, the scanner can also determine the distance from the robot to the object. The scanner can then provide the dimensions (e.g., length, width, and/or height) or overall volume, for example, of the object to the processor. In some examples, the scanner may provide only crude sizing information, for example, used primarily to identify a person on the floor, as opposed to other objects. In this configuration, the scanner may provide only an "above threshold" or "below threshold" output, with the threshold comprising a reasonable volume estimate for a person. In some examples, the threshold can comprise a range for the dimensions of the object (e.g., between four and seven feet) corresponds to the height of most humans, for example, or a range of volumes (e.g., between 20 and 30 cubic feet) that corresponds to the general volume of an average human. In other examples, the scanner can provide accurate volume, area, and/or dimension information for the object.

At 430, the processor can determine if the object is outside (or within) a predetermined size range. If, for example, the object is larger than the largest inventory item, then it is most likely not an inventory item. Similarly, if the item is only 0.5" tall, it is almost certainly not a person (assuming sensor accuracy). If the object is determined to have the same dimensions as an inventory item, on the other hand, then it may be identified as such. If the processor determines that the object is not a person, for example, then it is either an inventory item or a piece of debris on the floor and can simply be avoided.

At 435, the robot can be rerouted around the object to enable it to continue on the pathway. In some examples, the robot may use the object detection system to plot a course around the object. In other examples, the robot may receive updated routing instructions from the controller. In some examples, rerouting can include avoiding the object altogether by reversing direction and taking a different route (e.g., down a different aisle or row in the warehouse). In other examples, such as when the robot is able to identify the object as an inventory item, the robot can use known sizing information from the inventory data to plot a course around the inventory item.

At 430, if the system determines that the object is possibly a person or if the system simply cannot determine what the object is, it may be desirable for the robot to await further instructions. If the object is a person, for example, they may be in need of medical attention. At 440, therefore, the robot can come to a full stop and send a message to the controller. The controller can then send a message to a warehouse worker or a specialized robot to investigate the object, or take other appropriate action. This may include reviewing the object using the camera on the robot, for example, or walking out to the object to identify and/or move the object.

At 445, the robot can maintain the full stop until it is reset (manually or otherwise). In some examples, such as in warehouses that must meet certain established standards, the robot may require a manual reset. In other words, a worker must physically walk out to the robot and press a reset button. In this manner, the worker can verify the nature of the object, render medical help if necessary, and/or ensure the object is removed from the pathway. In other examples, the system may use a video camera, or other sensor, on the robot to enable a remote worker to identify the object and remotely reset the robot, as appropriate. Once the robot has been reset, the robot can continue to its final destination.

As shown in FIG. 4B, in some examples, the object identification system can comprise an RFID reader. At 450, the robot can scan the object with the RFID reader to obtain RFID data and/or determine if the object is an inventory item. At 455, the processor can determine if the object includes an RFID tag and retrieve any available RFID data therefrom. If the object contains an RFID tag, it can be determined from the RFID data to be an inventory item, warehouse equipment, or other identifiable object. At 435, once identified, the robot can reroute around the object and continue along the pathway.

As before, in some examples, the RFID reader may return only a binary output. In this configuration, if the object contains an RFID tag, it can be labeled an inventory item, for example, or a "known item" that the robot can simply maneuver around. In some examples, the RFID reader can additionally retrieve the information provided by the RFID tag on the object, which can include inventory data, among other things. The inventory data can include object dimensions, volume, area, or other physical features to enable the robot to plot a course around the object. In some examples, in addition to inventory items, inventory holders, and other warehouse equipment (e.g., chargers, maintenance bays, etc.) can also be labeled with RFID tags to enable the robot to identify and maneuver around most items in the warehouse.

At 455, if the object does not contain an RFID tag, the robot may be unable to identify the object. In some examples, at this point, the robot may use additional means, such as the aforementioned 3D scanner, to attempt to identify the object. In other examples, the object can simply be labeled as "unknown." At 440, if the object cannot be successfully identified using RFID, 3D scanning, or other means, or if operational protocols dictate, the robot can again come to a full stop. At 445, the robot can maintain the full stop until it is reset. In some examples, such as in warehouses that must meet certain work protocols, the robot may require a manual reset. In other examples, the robot may be reset remotely after a remote review by a worker, the controller, or other secondary system to the robot.

In some situations, warehouse equipment may be the object encountered by the robot along the pathway. The object could be an inventory holder, for example, that has fallen over into an aisle of the warehouse. The object could also be another robot that is broken down or simply waiting for traffic to clear. To this end, in some examples, some or all of the warehouse equipment such as, for example, inventory holders, robots, chargers, work stations, and maintenance bays can be marked with indicia such as, for example, fiducials, RFID, bar codes, or other means for identification by the robot.

As shown in FIG. 4C, in some examples, the system 400 can include a video camera, or other optical sensor. At 460, the system can scan the object with, for example, a video camera or bar code reader to attempt to identify the object. If, for example, the object is an inventory holder, it can be labeled with a bar code or fiducial to enable the robot to at least identify that it is warehouse equipment, at 465. In some examples, the robot may further be able to retrieve the exact equipment type, dimensional data, weight, normal location, and other information.

In some examples, at 465, the system 400 can merely identify an object as "known" or "unknown," enabling the robot to maneuver around known objects. In other words, the system 400 can include a simple binary identification system for warehouse equipment that can be easily maneuvered around by the robots without fear of damage, for example. In some examples, the system 400 can also use various indicia, such as reflective (or non-reflective) tape or surface coatings, bar codes, symbols, or alphanumeric labels, for example, such that the robot can identify the reflectivity or other features of the object and determine what the object is and how to maneuver around it. In other examples, the warehouse equipment can use a variety of markings to identify it as such and can also include additional indicia data, such as equipment size and shape, normal location, identification number, etc. In some examples, the warehouse equipment can include other indicia data, such as fiducials, 2D- or 3D-bar codes, alphanumeric labels, or other means to provide the robots with additional information useful for rerouting the robots, among other things. In some examples, the system can use indicia data to further classify the object as warehouse equipment, for example, or even as a specific type of warehouse equipment (e.g., inventory holders).

At 435, if the object is identified as warehouse equipment, for example, the robot can reroute around the equipment. As mentioned above, in some examples, the robot (or controller) can use equipment data to reroute around the warehouse equipment. In other examples, the robot can use the video camera, onboard proximity sensors, or other means to navigate around the warehouse equipment. In still other embodiments, the robot may simply reverse direction and reroute using a different row or aisle, for example, to reach its destination.

If, on the other hand, the robot cannot identify the object, at 440, the robot can again come to a stop and send a message to the controller. The controller can then provide the necessary review to identify and/or remove the object from the pathway. In some examples, a worker can use the camera on the robot to identify the object and provide a remote reset. At 445, the robot can resume normal operation when reset in the appropriate manner.

Figure 5:
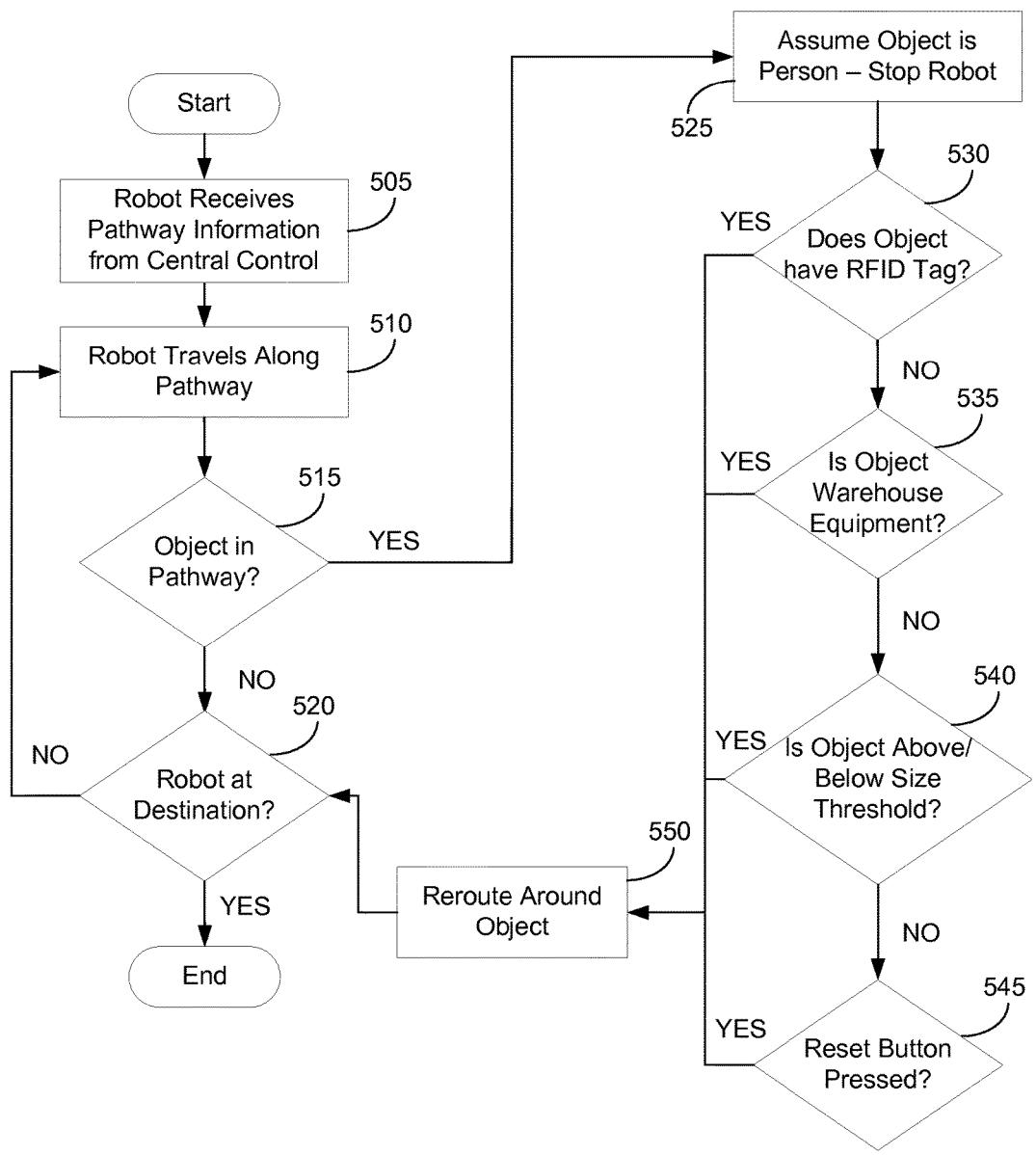
FIG. 5 is a flow diagram of an illustrative process for detecting and identifying an object encountered in the pathway of a robot using multiple sensors, in accordance with some examples of the present disclosure.

As shown in FIG. 5, in some examples, such as in "functionally safe" systems, increased safety levels may be required. These systems may conform to various functionally safe industry standards such as, for example, the International Electrotechnical Commission (IEC) 61508 standard. See, e.g., "Functional Safety and IEC 61508", International Electrotechnical Commission (2015) available at http://www.iec.ch/functionalsafety/. To this end, the system 500 can first assume that any object encountered is a person and stop the robot. Only if the system 500 is subsequently able to determine that the object is not a person, can the robot continue along the pathway. The initial routing routine is substantially the same as those discussed above.

At 505, the robot can receive pathway information from the controller. In some examples, the pathway information can simply include a final location within the warehouse. In this configuration, the robot can generate a pathway, based on known travel patterns, for example, from its current location to the final location, or destination, specified in the pathway information. In other examples, the controller can provide detailed routing information to the robot from the robot's current location to the requested destination. The routing information can include, for example, directions of travel, waypoints (e.g., fiducial markers), turns, and distances. The robot can then use the fiducials and other markers on the floor to navigate along the path provided in the pathway information.

At 510, the robot can travel along the pathway en route to the final destination and scan for objects in the pathway. In some examples, the robot can scan continuously for obstructions any time the robot is moving. In other examples, the robot can scan periodically as the robot is moving. In some examples, the robot can scan multiple times per second (e.g., 10 Hz), once per second, or once every several seconds (e.g., every 3, 5, or 10 seconds) depending on the speed of the robot, the range of the sensor, and/or traffic levels in the warehouse.

In some examples, the periodicity of the scan can change in concert with the speed of travel of the robot, for example, with increased robot travel speed triggering increased scanning frequency. Similarly, the scanning frequency can be increased based on the level of traffic in the warehouse. In other words, more active robots traveling through the warehouse at a given time can increase the scanning frequency accordingly. In other examples, the scanning frequency can be adjusted based on the range of the sensor on the robot, with longer range sensors requiring lower frequency scanning, and vice-versa.

At 515, a processor or other means can determine if an object has been detected in the pathway of the robot. As mentioned above, the object detection system may provide a simple binary, or on-off, signal to the processor. In other examples, the object detection system can provide a variable signal and the processor can determine if the signal is above a predetermined threshold, for example. At 520, if no object is detected, the processor can determine if the robot is at its destination, or final location. If so, the method 500 ends and the robot can receive the next command (e.g., "retrieve inventory holder 01XA5"). If, on the other hand, the robot detects an object in the pathway, the robot can use one or more sensors to determine an appropriate evasive action.

At 525, if the processor determines that an object is in the pathway of the robot, the robot can stop. In some examples, the robot can automatically and autonomously stop anytime an object is detected by the object detection system. In other embodiments, the robot can automatically receive a command from the controller to stop anytime an object is detected in the pathway. In still other embodiments, the robot may receive a constant or periodic "go" signal. In other words, for the robot to continue, the controller (or other system component) can constantly or periodically send a signal authorizing the robot to continue. In this configuration, therefore, when an object is detected, rather than sending a stop command, the stop command can constitute the removal of the go signal. As mentioned above, a full stop may be required under some standards or protocols to reduce the chances of a collision between the robot and a person, among other things.

After stopping, the robot can then run through a series of tests to determine if the object can be identified. For example, the robot may only be able to proceed if the object can be positively identified. In other words, if the robot cannot identify the object as an inventory item or warehouse equipment, for example, then the system 500 can label the object as a person, or simply as "unidentified," and remain stopped until reset. In other examples, if the robot can determine that the object is too small or too large to be a person, for example, the robot may be able to continue without a reset.

At 530, as before, the robot can scan the object with an RFID reader. RFID tags can be used to identify a variety of objects in the system including, but not limited to, inventory items and warehouse equipment. In some examples, objects that are suitable for the robots to maneuver around can include RFID tags. In this manner, if the object includes an RFID tag, at 550, the robot can reroute around the object and continue along the pathway.

At 535, if the object does not include an RFID tag, the object may nonetheless be identifiable by the robot. As discussed above, many items in the warehouse can include reflective (or non-reflective) paint or tape, fiducials, bar codes, or other means for the robot to identify the object. In some examples, all warehouse equipment can include reflective tape, for example, that creates a unique reflectivity when viewed by the video camera of the robot. In this configuration, warehouse workers can be forbidden from wearing reflective clothing (e.g., running shirts or shoes) to prevent misidentification by the robots. In this manner, if the robot detects a reflectivity above a certain threshold, at 550, the robot can reroute around the object and continue along the pathway.

If the object does not have the designated reflectivity (or other markings) and does not include an RFID tag, it may still be possible for the system 500 to determine that the object is not a person. At 540, the robot can scan the object using a 3D scanner to determine the approximate size of the object. The threshold may be set very conservatively. If, for example, the object is determined to be larger than one foot in any dimension, the system 500 can classify that object as a person. Of course, the dimensional thresholds can be determined based on the accuracy of the scanner, and other factors or protocols in place.

At 545, if the robot is unable to identify the object in a manner that is acceptable to the system 500, the robot can wait to be reset. In this manner, at 545, the robot remains in the stop mode as a default and remains stopped unless it can definitively identify the object or is reset. At 550, when the area is cleared by a worker, specialized robot, or other suitable means, the robot can then be reset and reroute or continue along the pathway, as applicable. Of course, in some examples, the object may be removed by the worker during the inspection/reset process, for example, obviating the need to reroute around the object.

In some examples, depending on the standard or protocol used, the robot can take a number of actions. With regard to a functional safety standard, for example, merely stopping the robot ("category 2") for further investigation may be sufficient. In higher safety rated systems, however, it may necessary to stop the robot and assume a safe state ("category 1"), or to stop by completely removing all power from the robot pending a reset ("category 0"). As a result, the system 500 can accommodate all three conditions merely by changing software parameters in the robot and/or the controller.

Figure 6:
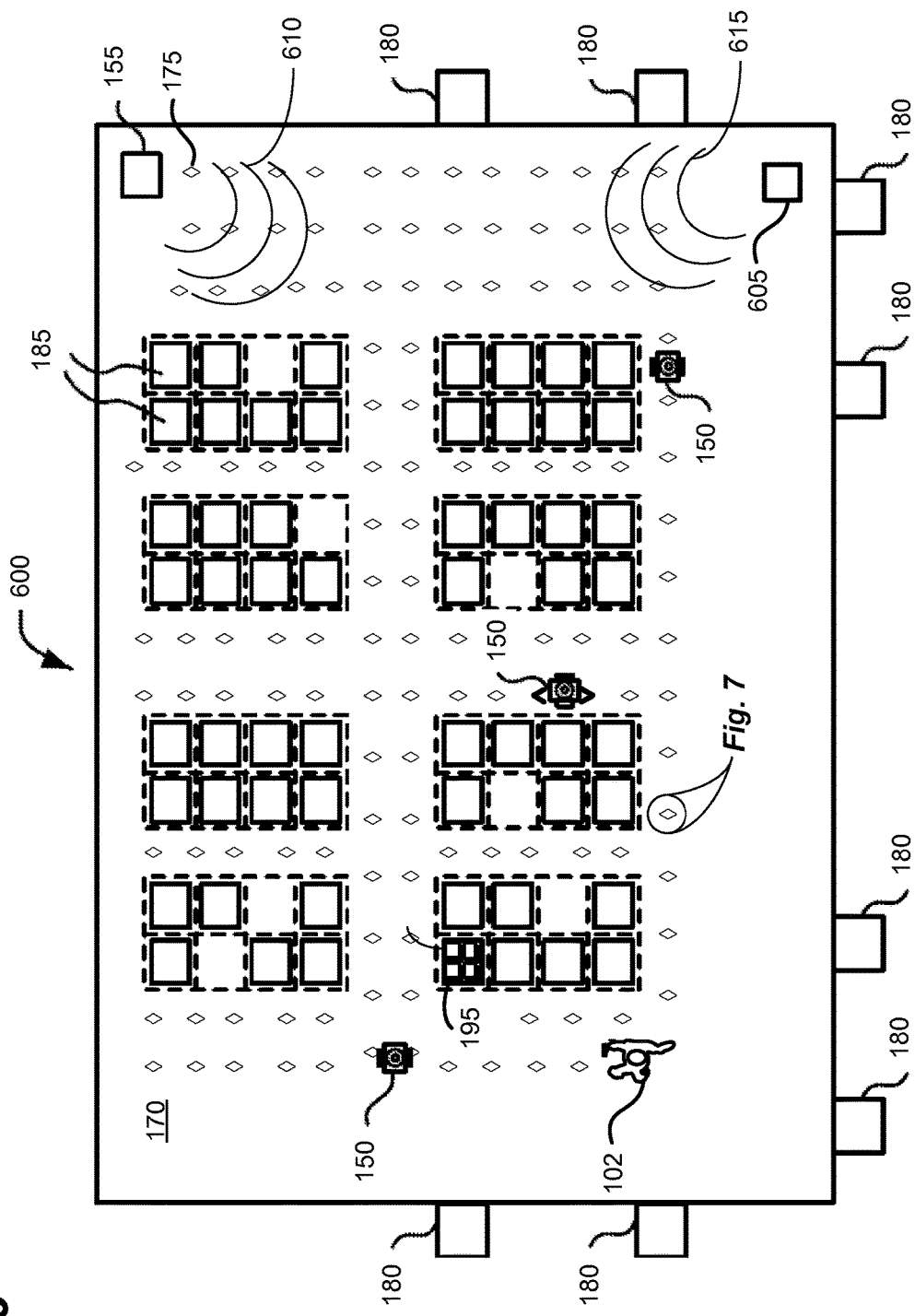
FIG. 6 is a schematic diagram that depicts components of another illustrative automated warehouse comprising a separate server, in accordance with some examples of the present disclosure.

As shown in FIG. 6, the fiducials 175 can comprise, for example, stickers or plaques attached to the warehouse floor 170. In some examples, the fiducials 175 can provide their location in the warehouse (e.g., they can include a coordinate, row and column number, grid number, GPS coordinates, location information, or other information). In some examples, the location of the fiducial 175 can be printed on the fiducial 175 and can be read by the camera 315 or bar code reader 335 on the robot 150.

Figure 7:
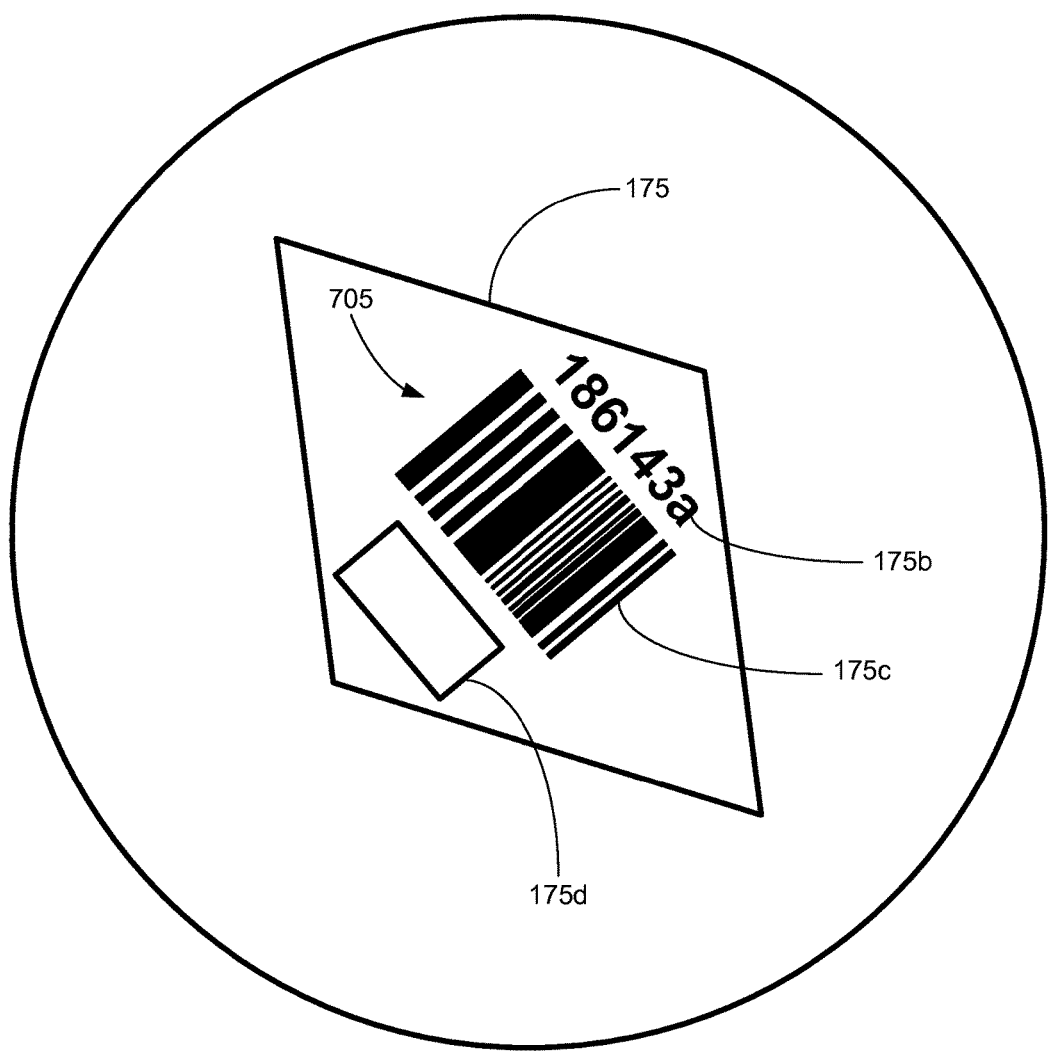
FIG. 7 is a top, detailed view of an illustrative fiducial comprising fiducial data, in accordance with some examples of the present disclosure.

In other examples, as shown in detail in FIG. 7, the fiducials 175 can also comprise additional fiducial data 705. The fiducial data 705 can comprise, for example, a fiducial identification number (ID) 175*b* (e.g., "fiducial 186143a"). In some examples, the robot 150 can read the fiducial ID 175*b* with the camera 315, or other suitable device, and can cross-reference the fiducial ID 175*b* with an onboard database to establish its location. In other embodiments, the controller 155 can include a fiducial database and the robot 150 can transmit the fiducial ID 175*b* to the controller 155 and the controller 155 can provide the location of the fiducial 175 to the robot 150.

In other examples, the fiducial data 705 can also comprise, for example, a bar code 175*c* and/or an RFID tag 175*d*, among other things, that can be read by the robot 150. In some examples, the bar code 175*c* or RFID tag 175*d* can have embedded location information to directly provide location information to the robot. In other embodiments, as discussed above, the robot 150 can read or scan the bar code 175*c* or RFID tag 175*d*, transmit the fiducial data 705 to the controller, and receive location information for the fiducial 175 from the controller 155 to determine the location of the robot 150 on the warehouse floor 170.

Referring back to FIG. 6, it may be desirable to have an object detection management system 600 separate from the management module or controller 155. In other words, the system 600 can comprise a controller 155 for managing overall routing and work flow for the inventory control system 200 and a second, or interaction, server 605 for managing robot 150/object 190 interactions. In this manner, a higher level of redundancy can be provided, and each system 200, 600 can be optimized for the purpose at hand. Dual systems 200, 600 may be required to meet certain standards or protocols discussed herein, for example.

In this configuration, the controller 155 can handle the routing and scheduling of robots 150 during normal operation—e.g., retrieving inventory holders 185 and delivering them to work stations 180—while the interaction server 605 can monitor robots 150 solely for the purpose of managing robots 150 when they encounter objects. In this manner, reliability is increased via redundant communications and control systems, and downtime and maintenance is reduced by improving the management of robot 150/object 190 interactions, among other things.

In some examples, the robots 150 can be in communication with the controller 155 via a first, dedicated communications network 610 and in communication with the interaction server 605 via a second, dedicated communications network 615. Both networks can comprise, for example, wireless LANs (e.g., 802.11x networks), or other suitable networks. In some examples, the interaction server 605 and second network 615 can also be on dedicated internet, power, or network connections, as necessary.

In some examples, therefore, the second network 615 can also comprise a network with a higher level of reliability and/or security than the first network 610. The second network 615 may also be able to override the first network 610. In other words, if the interaction server 605 determines that a collision between an object 190 and a robot 150 is imminent, the interaction server 605 can send a command to the robot 150 regardless of whether the robot 150 is currently receiving a command from the controller 155. In this case, the robot 150 can ignore the command from the controller 155, take evasive action, if necessary, and then reconnect with the controller 155 when the object 190 is no longer proximate the robot 150.

As discussed above, in some examples, the robot 150 can receive commands from the controller 155 regarding tasks and can also receive a constant or periodic go signal from the interaction server 605. The robot 150 may receive the go signal from the interaction server 605 at one second intervals (or other suitable interval), for example, indicating that the robot 150 can continue along the pathway. In this configuration, if the interaction server 605 determines that a collision between an object 190 and a robot 150 is imminent, the interaction server 605 can remove the go signal to the robot 150 regardless of whether the robot 150 is currently receiving a command from the controller 155. In this case, the robot 150 can ignore the command from the controller 155, take evasive action, if necessary, and then reconnect with the controller 155 when the object 190 is no longer proximate the robot 150. In this manner, it is the removal of the go signal, rather than the presence of a stop signal, that causes the robot 150 to stop.

While several possible examples are disclosed above, examples of the present disclosure are not so limited. For instance, while a number of sensors and combinations of sensors are disclosed, other sensors and combinations of sensors could be used to detect and identify objects. In addition, the location and configuration used for various features of examples of the present disclosure such as, for example, the configuration of the robots, the control command structure, and the layout of the warehouse can be varied according to a particular warehouse, location, or robot that requires variations due to, for example, size or power constraints, the type of robot required, or regulations related to transmission interference or other applicable standards or protocols, for example. Such changes are intended to be embraced within the scope of this disclosure.

The specific configurations, choice of materials, and the size and shape of various elements can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method to detect and classify an object in a pathway of a robot, the method comprising:
   receiving, with a transceiver on a robot, instructions to travel to a location via a pathway;
   sending, from a processor on the robot to a drive system on the robot, instructions to travel along the pathway;
   detecting, with an object detection system on the robot, an object in the pathway;
   sending, from the processor to the drive system, instructions to slow or stop;
   scanning the object with a radio frequency identification (RFID) reader on the robot to determine if there is an RFID tag associated with the object;
   scanning the object with a three-dimensional (3D) scanner to provide approximate sizing data for the object to the processor;
   scanning the object with an imaging device to provide indicia data to the processor;
   determining that the object does not have an RFID tag;
   determining, based at least in part on the sizing data that the object is trash; and
   sending, from the processor to the drive system, instructions to run over the object.

2. The method of claim 1, wherein the sizing data indicates that the object is below a predetermined size range.

3. The method of claim 1, wherein the RFID reader provides no RFID data from the object to the processor;
   wherein the sizing data for the object is within a predetermined size range; and
   wherein the imaging device provides no indicia data for the object.

4. The method of claim 1,
   wherein a size of the object is above or below a predetermined range; and
   wherein, responsive to the size of the object being above or below the predetermined range, the processor classifies the object as a non-human.

5. A method to detect and classify an object in a pathway of a robot, the method comprising:
   receiving, with a transceiver on a robot, instructions to travel to a location via a pathway;
   sending, from a processor on the robot to a drive system on the robot, instructions to travel along the pathway;
   detecting, with an object detection system on the robot, an object in the pathway;
   sending, from the processor to the drive system, instructions to slow or stop;

scanning the object with a radio frequency identification (RFID) reader on the robot to determine if there is an RFID tag associated with the object;

scanning the object with a three-dimensional (3D) scanner to provide approximate sizing data for the object to the processor;

scanning the object with an imaging device to provide indicia data to the processor; determining that the object has an RFID tag associated with an inventory item;

determining that the damage caused by the robot running over the inventory item is below a predetermined threshold; and sending, from the processor to the drive system, instructions to run over the object based on one or more of whether the RFID tag is present, the sizing data, or the indicia data.

6. The method of claim 5, wherein the imaging device comprises a video camera; and wherein the indicia data comprises a surface coating on the object with a predetermined reflectivity associated with one of an inventory item or equipment.

7. The method of claim 5, wherein the sizing data indicates that the object is above or below a predetermined size range.

8. The method of claim 5, wherein a size of the object is above or below a predetermined range; and wherein, responsive to the size of the object being above or below the predetermined range, the processor classifies the object as a non-human.

9. A robot configured to move inventory holders about an environment and comprising:

a drive system configured to move the robot throughout the environment;

an object detection system configured to detect an object in a pathway of the robot;

an object identification system configured to receive classification data for the object;

a transceiver configured to send and receive wired and wireless communications; and a processor in communication with at least the drive system, object detection system, object identification system, and transceiver, the processor including computer-executable instructions to cause the processor to:

receive, with the transceiver, instructions to travel to a location via a pathway;

send, from a processor to the drive system, instructions to travel along the pathway;

detect, with the object detection system, an object in the pathway;

send, from the processor to the drive system, instructions to slow or stop;

scan the object with a radio frequency identification (RFID) reader on the robot to determine if there is an RFID tag associated with the object;

scan the object with a three-dimensional (3D) scanner to provide approximate sizing data for the object to the processor;

scan the object with an imaging device to provide indicia data to the processor;

determine that the object has an RFID tag associated with an inventory item;

determine that the damage caused by the robot running over the inventory item is below a predetermined threshold; and send, from the processor to the drive system, instructions to run over the object based on one or more of whether the RFID tag is present, the sizing data, or the indicia data.

10. The robot of claim 9, wherein the sizing data indicates that the object is above or below a predetermined size range.

11. The robot of claim 9, wherein a size of the object is above or below a predetermined range; and wherein, responsive to the size of the object being above or below the predetermined range, the object identification system classifies the object as a non-human.

12. The robot of claim 9, wherein the imaging device comprises a video camera; and wherein the indicia data comprises a surface coating on the object with a predetermined reflectivity associated with one of an inventory item or equipment.

* * * * *